(12) United States Patent
Nakamura

(10) Patent No.: US 11,305,601 B2
(45) Date of Patent: Apr. 19, 2022

(54) CONTROL APPARATUS FOR SUSPENSION APPARATUS AND SUSPENSION SYSTEM

(71) Applicant: Showa Corporation, Gyoda (JP)

(72) Inventor: Junya Nakamura, Fukuroi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 421 days.

(21) Appl. No.: 16/548,354

(22) Filed: Aug. 22, 2019

(65) Prior Publication Data
US 2020/0009935 A1    Jan. 9, 2020

Related U.S. Application Data

(63) Continuation of application No. PCT/JP2017/025762, filed on Jul. 14, 2017.

(30) Foreign Application Priority Data

Jun. 30, 2017    (JP) .............................. JP2017-129224

(51) Int. Cl.
*B60G 17/018*    (2006.01)
*B60G 17/016*    (2006.01)
(Continued)

(52) U.S. Cl.
CPC ....... *B60G 17/018* (2013.01); *B60G 17/0164* (2013.01); *B60W 30/025* (2013.01);
(Continued)

(58) Field of Classification Search
None
See application file for complete search history.

(56) References Cited

U.S. PATENT DOCUMENTS 5,979,885 A * 11/1999 Katsuda ............. B60G 17/0165
188/266.1
6,285,935 B1 * 9/2001 Murata ................ B60G 17/016
280/5.512
(Continued)

FOREIGN PATENT DOCUMENTS

JP    62-060369 A    3/1987
JP    02-202602 A    8/1990
(Continued)

OTHER PUBLICATIONS

International Search Report dated Sep. 5, 2017 for the corresponding International Application No. PCT/JP2017/025762.

*Primary Examiner* — Fadey S. Jabr
*Assistant Examiner* — Cole J Werley
(74) *Attorney, Agent, or Firm* — Leason Ellis LLP

(57) ABSTRACT

A control apparatus for a suspension apparatus includes: an acquisition section which acquires a stroke amount of the suspension apparatus disposed between a vehicle body and a wheel to damp vibration propagated from the wheel; a calculation section which calculates a stroke velocity based on the stroke amount; and a damping force control section which controls damping force of the suspension apparatus based on the stroke velocity. The calculation section includes a first calculation section which differentiates the stroke amount by use of a first time constant as a time constant, to thereby calculate a first stroke velocity, and a second calculation section which differentiates the stroke amount by use of a second time constant larger than the first time constant as a time constant, to thereby calculate a second stroke velocity, and calculates the stroke velocity based on the first stroke velocity and the second stroke velocity.

4 Claims, 15 Drawing Sheets

(51) Int. Cl.
*B60W 30/02* (2012.01)
*B60G 17/019* (2006.01)
*B60G 17/08* (2006.01)

(52) U.S. Cl.
CPC ............ *B60G 17/019* (2013.01); *B60G 17/08* (2013.01); *B60G 2400/25* (2013.01); *B60G 2500/10* (2013.01)

(56) References Cited

U.S. PATENT DOCUMENTS

| | | |
|---|---|---|
| 2016/0236672 A1 | 8/2016 | Yanagida et al. |
| 2016/0272030 A1* | 9/2016 | Nedachi ............... B60G 17/016 |
| 2016/0272032 A1 | 9/2016 | Nedachi |
| 2017/0166028 A1 | 6/2017 | Kubota et al. |
| 2017/0267051 A1* | 9/2017 | Toyohira ............. B60G 17/018 |
| 2018/0154873 A1 | 6/2018 | Masuda |

FOREIGN PATENT DOCUMENTS

| | | |
|---|---|---|
| JP | 07-285311 A | 10/1995 |
| JP | 2003-124825 A | 4/2003 |
| JP | 2005-096671 A | 4/2005 |
| JP | 2007-267375 A | 10/2007 |
| JP | 2014-172594 A | 9/2014 |
| JP | 2016-055697 A | 4/2016 |
| JP | 2016-150672 A | 8/2016 |
| JP | 2016-175469 A | 10/2016 |
| WO | WO-2017/033801 A1 | 3/2017 |

\* cited by examiner

FIG. 7B $$Vpm = Kvp \times \cfrac{2\left(\overbrace{\sum_{i=0}^{m-1}(t_i)}^{(1)} - \overbrace{\sum_{i=m}^{2m-1}(t_i)}^{(2)}\right)^{(3)}}{m \cdot \underbrace{\sum_{i=0}^{2m-1}(t_i)}_{(4)}} \quad (7)$$

$$Vp = Kt \times Vpm1 + (1 - Kt) \times Vpm2$$

FIG. 9A

[IN CASE WHERE Kt DECREASES]
WHEN Ktn0 (Kt CURRENT VALUE) < Ktn1 (Kt PREVIOUS VALUE) − KT_DECREASE
IS ESTABLISHED: Kt = Ktn1 (Kt PREVIOUS VALUE) − KT_DECREASE
WHEN Ktn0 (Kt CURRENT VALUE) < Ktn1 (Kt PREVIOUS VALUE) − KT_DECREASE
IS NOT ESTABLISHED: Kt = Ktn0 (Kt CURRENT VALUE)

FIG. 9B

[IN CASE WHERE Kt INCREASES]
WHEN Ktn0 (Kt CURRENT VALUE) > Ktn1 (Kt PREVIOUS VALUE) + KT_INCREASE
IS ESTABLISHED: Kt = Ktn1 (Kt PREVIOUS VALUE) + KT_INCREASE
WHEN Ktn0 (Kt CURRENT VALUE) > Ktn1 (Kt PREVIOUS VALUE) + KT_INCREASE
IS NOT ESTABLISHED: Kt = Ktn0 (Kt CURRENT VALUE)

CONTROL APPARATUS FOR SUSPENSION APPARATUS AND SUSPENSION SYSTEM

CROSS-REFERENCE TO RELATED APPLICATIONS

This application is a continuation of PCT application No. PCT/JP2017/025762 filed on Jul. 14, 2017, which claims for priority of Japanese Patent Application No. 2017-129224 filed on Jun. 30, 2017, the contents of which are incorporated herein by reference.

TECHNICAL FIELD

The present invention relates to a control apparatus for a suspension apparatus and a suspension system.

BACKGROUND ART

Vehicles such as motorcycles are provided with suspension apparatuses (suspensions) for suitably reducing vibration transmitted from road surfaces toward vehicle bodies during travelling to thereby improve ride comfortability or operation stability. Recently, so-called electronic control suspensions which can electronically control damping forces of such suspension apparatuses are gaining popularity.

A displacement sensor for detecting a relative displacement between a spring upper member and a spring lower member of a vehicle, and a velocity detection apparatus for obtaining a stroke velocity of a damper interposed between the spring upper member and the spring lower member based on a damping coefficient of the damper and the relative displacement have been described in JP-A-2014-172594.

In addition, an oscillator has been described in JP-A-2007-267375. The oscillator has a voltage control oscillator, a control circuit which outputs digital data of a rough adjustment frequency and digital data of a fine adjustment frequency, a rough adjustment DAC which outputs the digital data of the rough adjustment frequency as an analog signal, a fine adjustment DAC which outputs the digital data of the fine adjustment frequency as an analog signal, a first LPF which is slow in response speed and which removes noise from the output from the rough adjustment DAC to input the noise-removed output to a control terminal of the voltage control oscillator, a second LPF which is fast in response speed and which converts the output from the fine adjustment DAC into a voltage to smoothen a control voltage, and a synthesizer which synthesizes the signals from the two LPFs, wherein the voltage control oscillator, the LPFs and the synthesizer are received in a shield casing.

Damping force of such a suspension apparatus may be controlled based on a stroke velocity. The stroke velocity can be obtained by differentiating a stroke amount detected by a stroke sensor attached to the suspension apparatus.

However, in differentiating the stroke amount, accuracy of the stroke velocity which is a differential amount is apt to be degraded when importance is attached to responsiveness and a time constant is reduced. On the other hand, responsiveness is apt to be degraded when importance is attached to accuracy and the time constant is increased. That is, the responsiveness and the accuracy are generally in a trade-off relation.

An object of the present invention is to provide a control apparatus for a suspension apparatus etc., in which, when a stroke velocity is obtained by differentiating a stroke amount, compatibility between responsiveness and accuracy can be attained so that damping force of the suspension apparatus can be controlled more suitably.

SUMMARY OF THE INVENTION

The present invention which has been accomplished to attain the foregoing object provides a control apparatus for a suspension apparatus, including: an acquisition section which acquires a stroke amount of the suspension apparatus disposed between a vehicle body and a wheel to damp vibration propagated from the wheel; a calculation section which calculates a stroke velocity based on the stroke amount; and a damping force control section which controls damping force of the suspension apparatus based on the stroke velocity, wherein the calculation section includes a first calculation section which differentiates the stroke amount by use of a first time constant as a time constant, to thereby calculate a first stroke velocity, and a second calculation section which differentiates the stroke amount by use of a second time constant larger than the first time constant as a time constant, to thereby calculate a second stroke velocity, and the calculation section calculates the stroke velocity based on the first stroke velocity and the second stroke velocity.

Here, configuration may be made so that the calculation section further includes a mixture ratio deriving section and a mixture section, the mixture ratio deriving section calculates a mixture ratio determined based on the first stroke velocity, and the mixture section calculates a weighted average of the first stroke velocity and the second stroke velocity by use of the mixture ratio to thereby calculate the stroke velocity.

In addition, configuration may be made so that the calculation section further includes a mixture ratio restricting section, and when the mixture ratio that has been newly obtained has a difference not smaller than a predetermined value with respect to the mixture ratio that was previously obtained, the mixture ratio restricting section restricts a change amount of the mixture ratio which has been newly obtained.

Further, configuration may be made so that the mixture ratio restricting section places a restriction on the change amount of the mixture ratio when the stroke velocity decreases with time and a restriction on the change amount of the mixture ratio when the stroke velocity increases with time, and a degree of the restriction placed when the stroke velocity decreases with time is different from a degree of the restriction placed when the stroke velocity increases with time.

In addition, the present invention provides a differential amount calculation apparatus including: a differentiation-subject amount acquiring section which acquires an amount of a differentiation subject, which changes with time and serves as a subject of differentiation; and a differential amount calculating section which differentiates the amount of the differentiation subject, to thereby calculate a differential amount, wherein the differential amount calculating section includes a first differential amount calculating section which differentiates the amount of the differentiation subject by use of a first time constant as a time constant, to thereby calculate a first differential amount, and a second differential amount calculating section which differentiates the amount of the differentiation subject by use of a second time constant larger than the first time constant as a time constant, to thereby calculate a second differential amount, and the differential amount calculating section calculates the differential amount based on the first differential amount and the second differential amount.

Here, the differential amount calculating section may calculate a velocity or an acceleration as the differential amount.

In addition, configuration may be made so that the differential amount calculating section further includes a mixture ratio deriving section and a mixture section, the mixture ratio deriving section calculates a mixture ratio determined based on the first differential amount, and the mixture section calculates a weighted average of the first differential amount and the second differential amount by use of the mixture ratio to thereby calculate the differential amount.

In addition, configuration may be made so that the differential amount calculating section further includes a mixture ratio restricting section, and when the mixture ratio that has been newly obtained has a difference not smaller than a predetermined value with respect to the mixture ratio that was previously obtained, the mixture ratio restricting section restricts a change amount of the mixture ratio that has been newly obtained.

Further, configuration may be made so that the mixture ratio restricting section places a restriction on the change amount of the mixture ratio when the differential amount decreases with time and a restriction on the change amount of the mixture ratio when the differential amount increases with time, and a degree of the restriction placed when the differential amount decreases with time is different from a degree of the restriction placed when the differential amount increases with time.

Further, the present invention provides a non-transitory computer-readable recording medium having a program recorded therein so that a computer executing the program can carry out: a differentiation-subject amount acquiring function of acquiring an amount of a differentiation subject, which changes with time and serves as a subject of differentiation; and a differential amount calculating function of differentiating the amount of the differentiation subject, to thereby calculate a differential amount, wherein the differential amount calculating function is to differentiate the amount of the differentiation subject by use of a first time constant as a time constant, to thereby calculate a first differential amount, and to differentiate the amount of the differentiation subject by use of a second time constant larger than the first time constant as a time constant, to thereby calculate a second differential amount, and the differential amount calculating function is to calculate the differential amount based on the first differential amount and the second differential amount.

Here, configuration may be made so that the differential amount calculating function is to calculate a mixture ratio determined based on the first differential amount, and calculate a weighted average of the first differential amount and the second differential amount by use of the mixture ratio to thereby calculate the differential amount.

In addition, configuration may be made so that the differential amount calculating function is to restrict a change amount of the mixture ratio that has been newly obtained, when the mixture ratio that has been newly obtained has a difference not smaller than a predetermined value with respect to the mixture ratio that was previously obtained.

Further, configuration may be made so that the differential amount calculating function is to place a restriction on the change amount of the mixture ratio when the differential amount decreases with time and a restriction on the change amount of the mixture ratio when the differential amount increases with time, and a degree of the restriction placed when the differential amount decreases with time is different from a degree of the restriction placed when the differential amount increases with time.

Further, the present invention provides a suspension system including: a suspension apparatus which is disposed between a vehicle body and a wheel of a vehicle to damp vibration propagated from the wheel; and a control section which controls damping force of the suspension apparatus; wherein: the control section includes: an acquisition section which acquires a stroke amount of the suspension apparatus; a calculation section which calculates a stroke velocity based on the stroke amount; and a damping force control section which controls the damping force of the suspension apparatus based on the stroke velocity, and the calculation section includes a first calculation section which differentiates the stroke amount by use of a first time constant as a time constant, to thereby calculate a first stroke velocity, and a second calculation section which differentiates the stroke amount by use of a second time constant larger than the first time constant as a time constant, to thereby calculate a second stroke velocity, and the calculation section calculates the stroke velocity based on the first stroke velocity and the second stroke velocity.

According to the present invention, it is possible to provide a control apparatus for a suspension apparatus, etc. in which, when a stroke velocity is calculated by differentiating a stroke amount, compatibility between responsiveness and accuracy of the stroke velocity can be attained so that damping force of the suspension apparatus can be controlled more suitably.

BRIEF DESCRIPTION OF THE DRAWINGS

FIG. 7B is a view showing the method of differentiating the stroke amount by the first stroke velocity calculation section and the second stroke velocity calculation section.

FIG. 9A is a numerical expression for explaining an operation of a mixture ratio restricting section.

FIG. 9B is a numerical expression for explaining an operation of the mixture ratio restricting section.

DESCRIPTION OF EMBODIMENT

An embodiment of the present invention will be described below in detail with reference to the accompanying drawings.

(Motorcycle)

Figure 1:
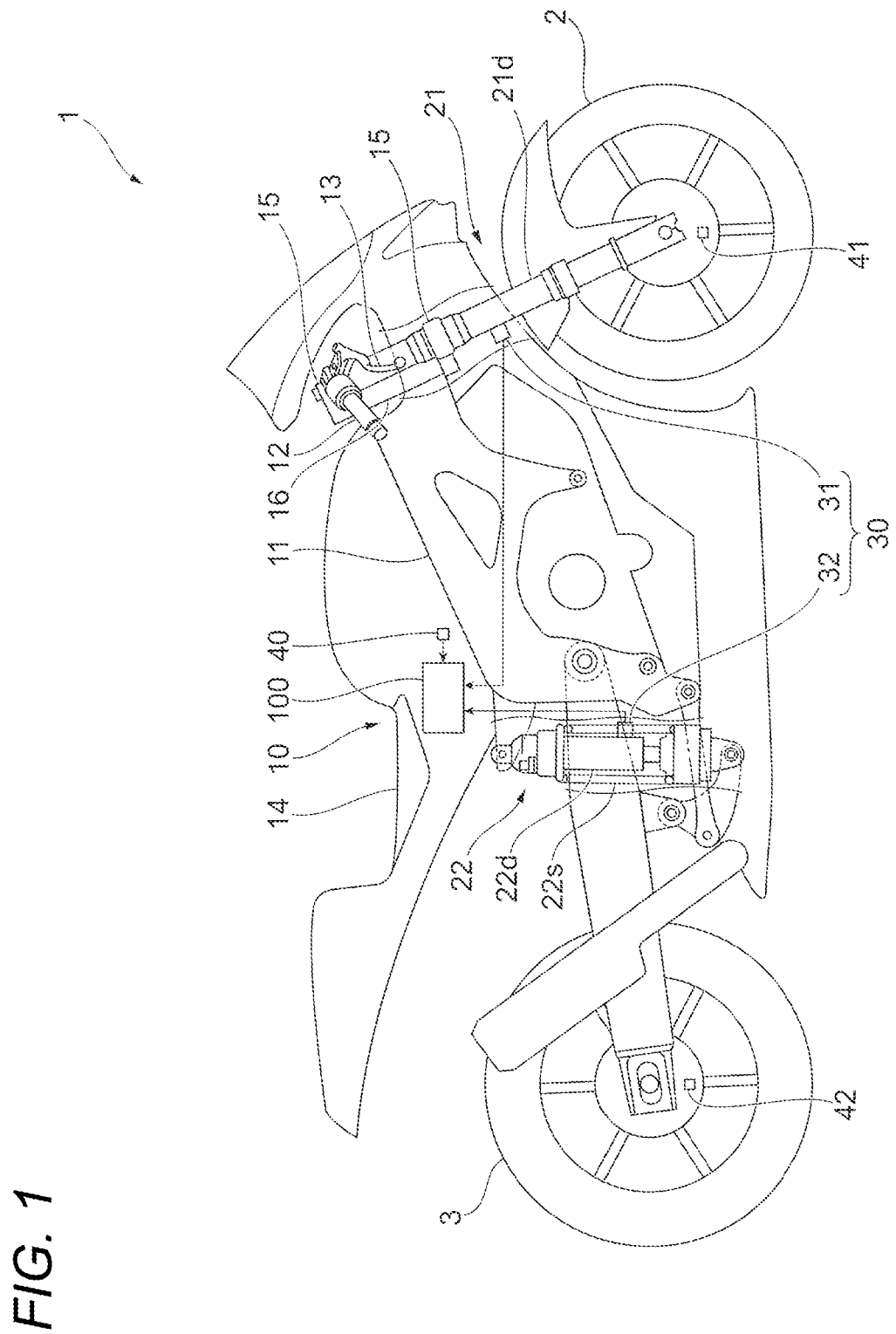
FIG. 1 is a view showing a schematic configuration of a motorcycle according to the present embodiment.

FIG. 1 is a view showing a schematic configuration of a motorcycle 1 according to the present embodiment.

The motorcycle 1 is provided with a front wheel 2, a rear wheel 3, and a vehicle body 10. The front wheel 2 is a wheel on a front side. The rear wheel 3 is a wheel on a rear side. The vehicle body 10 has a vehicle body frame 11, handles 12, brake levers 13, a seat 14, etc. The vehicle body frame 11 forms a frame of the motorcycle 1.

In addition, the motorcycle 1 has front wheel-side suspensions 21 coupling the front wheel 2 and the vehicle body 10 to each other. In addition, the motorcycle 1 is provided with two brackets 15 which retain the suspension 21 disposed on a left side of the front wheel 2 and the suspension 21 disposed on a right side of the front wheel 2, and a shaft 16 which is disposed between the two brackets 15. The shaft 16 is supported on the vehicle body frame 11 rotatably. Each suspension 21 is provided with a suspension spring (not shown) absorbing shock applied from a road surface etc. to the front wheel 2, and a damping device 21d damping vibration of the suspension spring.

In addition, the motorcycle 1 has a rear wheel-side suspension 22 coupling the rear wheel 3 and the vehicle body 10 to each other. The suspension 22 is provided with a suspension spring 22s absorbing shock applied from the road surface etc. to the rear wheel 3, and a damping device 22d damping vibration of the suspension spring 22s.

The damping device 21d and the damping device 22d are configured in a similar manner or the same manner. In the following description, the damping device 21d and the damping device 22d may be generically referred to as "damping device 200".

In addition, the front wheel-side suspension 21 and the rear wheel-side suspension 22 may be generically referred to as "suspension". In addition, the front wheel 2 and the rear wheel 3 may be generically referred to as "wheel".

Incidentally, in the present embodiment, the suspension disposed between the vehicle body 10 and the wheel of the vehicle (motorcycle 1) can be grasped as a suspension apparatus damping vibration propagated from the wheel.

Figure 2:
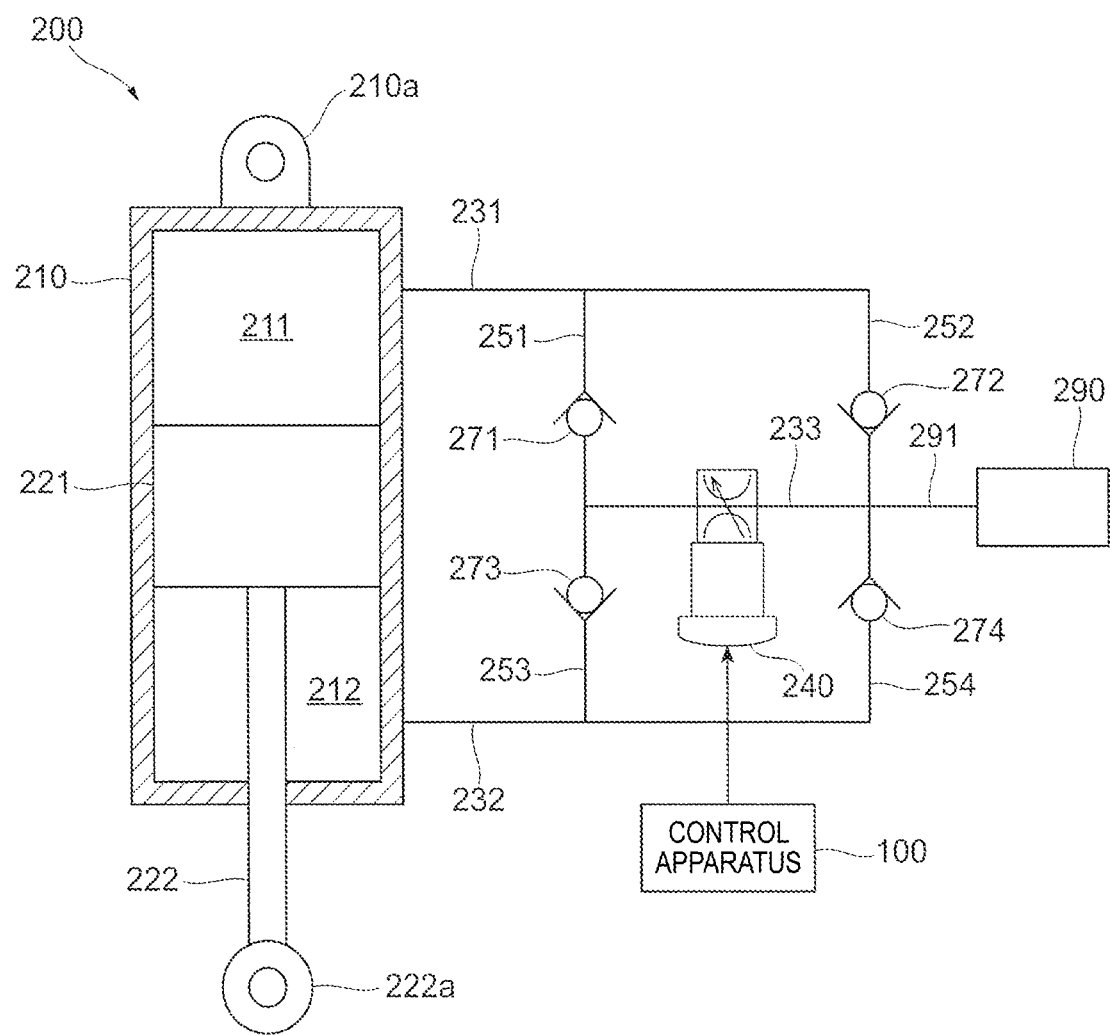
FIG. 2 is a view showing a schematic configuration of a damping device.
Figure 3:
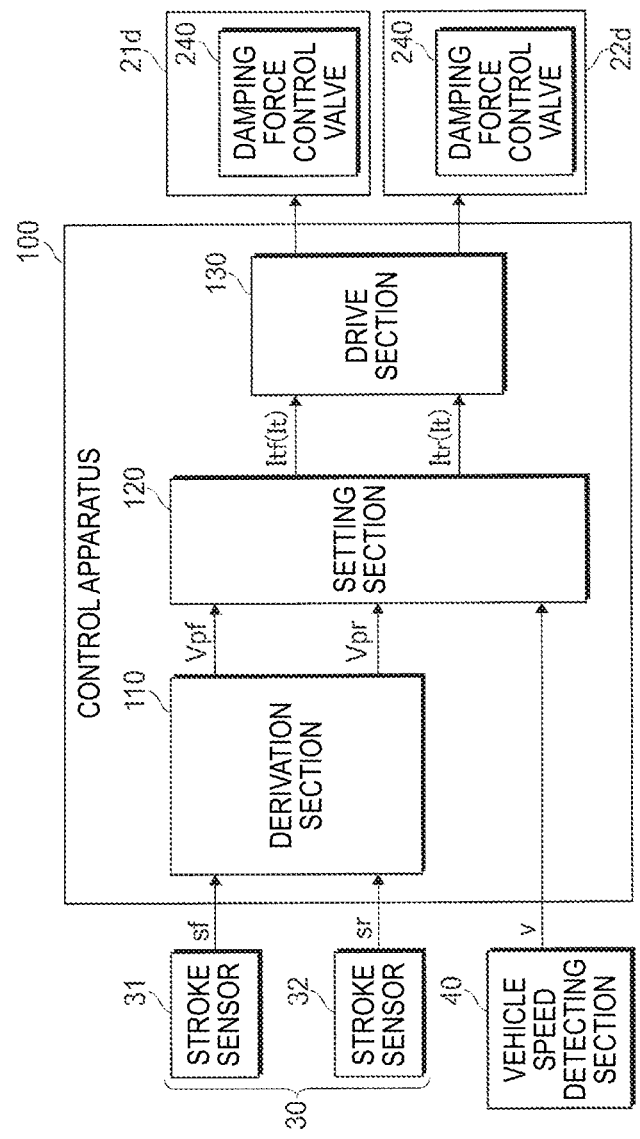
FIG. 3 is a diagram of a schematic configuration of a control apparatus.

FIG. 2 is a view showing a schematic configuration of the damping device 200. FIG. 3 is a diagram of a schematic configuration of a control apparatus 100.

The motorcycle 1 is provided with the control apparatus 100 controlling damping forces of the suspension device 21d and the suspension device 22d. Output signals from a stroke sensor 31 detecting an extension/compression amount of the suspension 21, and a stroke sensor 32 detecting an extension/compression amount of the suspension 22 are inputted to the control apparatus 100. In the following description, the stroke sensor 31 and the stroke sensor 32 may be generically referred to as "stroke sensor 30".

In addition, an output signal v etc. from a vehicle speed detecting section 40 detecting a vehicle speed Vc which is a movement speed of the motorcycle 1 is inputted to the control apparatus 100. The vehicle speed detecting section 40 detects the vehicle speed Vc based on output values from a rotation angle detecting sensor 41 detecting a rotation angle of the front wheel 2 and a rotation angle detecting sensor 42 detecting a rotation angle of the rear wheel 3.

(Damping Device)

The damping device 200 is provided with a cylinder 210 filled with working oil, a piston 221 received movably inside the cylinder 210, and a piston rod 222 retaining the piston 221. One side (upper side in FIG. 2) end portion 210a of the cylinder 210 is coupled to the vehicle body 10. The piston rod 222 retains the piston 221 at its one side end portion, and has the other side (lower side in FIG. 2) end portion 222a coupled to the wheel. Incidentally, the damping device in the present invention is not limited to such a form. The damping device in the present invention may have a configuration in which the other side end portion of the cylinder 210 is coupled to the wheel, and the other side end portion of the piston rod 222 retains the piston 221 while the one side end portion of the piston rod 222 is coupled to the vehicle body 10.

In the damping device 200, a compression stroke is performed in order to move the piston 221 toward the vehicle body 10 side (the upper side in FIG. 2) to thereby reduce the entire length of the damping device 200, and an extension stroke is performed in order to move the piston 221 toward the wheel side (the lower side in FIG. 2) to thereby increase the entire length of the damping device 200.

By the piston 221 received inside the cylinder 210, the cylinder 210 is internally sectioned into a compression-side oil chamber 211 and an extension-side oil chamber 212. Pressure of the working oil in the compression-side oil chamber 211 increases in the compression stroke. Pressure of the working oil in the extension-side oil chamber 212 increases in the extension stroke.

The damping device 200 has a first oil path 231 which is connected to the oil chamber 211 inside the cylinder 210, and a second oil path 232 which is connected to the oil chamber 212 inside the cylinder 210. In addition, the damping device 200 has a third oil path 233 which is provided between the first oil path 231 and the second oil path 232, and a damping force control valve 240 which is provided in the third oil path 233. In addition, the damping device 200 has a first branch path 251 which connects the first oil path 231 and one end portion of the third oil path 233 to each other, and a second branch path 252 which connects the first oil path 231 and the other end portion of the third oil path 233 to each other. In addition, the damping device 200 has a third branch path 253 which connects the second oil path 232 and the one end portion of the third oil path 233 to each other, and a fourth branch path 254 which connects the second oil path 232 and the other end portion of the third oil path 233 to each other.

In addition, the damping device 200 has a first check valve 271 which is provided in the first branch path 251 and which allows the working oil to move from the first oil path 231 toward the third oil path 233 and prohibits the working oil from moving from the third oil path 233 toward the first oil path 231. In addition, the damping device 200 has a second check valve 272 which is provided in the second branch path 252 and which allows the working oil to move from the third oil path 233 toward the first oil path 231 and prohibits the working oil from moving from the first oil path 231 toward the third oil path 233.

In addition, the damping device 200 has a third check valve 273 which is provided in the third branch path 253 and which allows the working oil to move from the second oil path 232 toward the third oil path 233 and prohibits the working oil from moving from the third oil path 233 toward the second oil path 232. In addition, the damping device 200 has a fourth check valve 274 which is provided in the fourth branch path 254 and which allows the working oil to move from the third oil path 233 toward the second oil path 232 and prohibits the working oil from moving from the second oil path 232 toward the third oil path 233.

In addition, the damping device 200 has a reservoir 290 and a reservoir passage 291. The reservoir 290 has a function for storing the working oil and supplying/discharging the working oil. The reservoir passage 291 connects the reservoir 290 and the other end portion of the third oil path 233 to each other.

The damping force control valve 240 has a solenoid. By control of an amount of a current conducted to the solenoid, pressure of the working oil passing through the valve can be controlled. The amount of the current conducted to the solenoid is controlled by the control apparatus 100. When oil pressure of one of the oil chamber 211 and the oil chamber 212 of the cylinder 210 becomes higher than releasing pressure, the damping force control valve 240 allows the working oil to flow into the other oil chamber. That is, when the oil pressure of the oil chamber 211 becomes higher than the releasing pressure, the damping force control valve 240 allows the working oil to flow into the oil chamber 212. Thus, the damping force control valve 240 changes damping force (compression-side damping force) generated when the damping device 200 is in the compression stroke. In addition, when the oil pressure of the oil chamber 212 becomes higher than the releasing pressure, the damping force control value 240 allows the working oil to flow into the oil chamber 211. Thus, the damping force control value 240 changes damping force (extension-side damping force) generated when the damping device 200 is in the extension stroke.

More specifically, when the piston 221 moves toward the oil chamber 211, the oil pressure of the oil chamber 211 increases. The working oil inside the oil chamber 211 moves toward the damping force control valve 240 through the first oil path 231 and the first branch path 251. The pressure of the working oil passing through the damping force control valve 240 is adjusted by valve pressure of the damping force control valve 240. Thus, the compression-side damping force is adjusted. The working oil passing through the damping force control valve 240 flows into the oil chamber 212 through the fourth branch path 254 and the second oil path 232.

On the other hand, when the piston 221 moves toward the oil chamber 212, the oil pressure of the oil chamber 212 increases. The working oil inside the oil chamber 212 moves toward the damping force control valve 240 through the second oil path 232 and the third branch path 253. The pressure of the working oil passing through the damping force control valve 240 is adjusted by the valve pressure of the damping force control valve 240. Thus, the extension-side damping force is adjusted. The working oil passing through the damping force control valve 240 flows into the oil chamber 211 through the second branch path 252 and the first oil path 231.

(Control Apparatus 100)

The control apparatus 100 is an arithmetic and logic circuit including a CPU, an ROM, an RAM, a backup RAM, etc.

A front wheel-side stroke signal sf in which an extension/compression amount of the suspension 21 detected by the stroke sensor 31 has been converted into an output signal, and a rear wheel-side stoke signal sr in which an extension/compression amount of the suspension 22 detected by the stroke sensor 32 has been converted into an output signal are inputted to the control apparatus 100. In addition thereto, the output signal v etc. corresponding to the vehicle speed Vc from the vehicle speed detecting section 40 is inputted to the control apparatus 100.

The control apparatus 100 is provided with a derivation section 110 which calculates stroke velocities Vpf and Vpr as change velocities of strokes based on the extension/compression amounts detected by the stroke sensor 30. In addition, the control apparatus 100 is provided with a setting section 120 which sets target currents Itf and Itr fed to the solenoids of the damping force control valves 240, based on the stroke velocities Vpf and Vpr calculated by the derivation section 110, the output signal v from the vehicle speed detecting section 40, etc. In addition, the control apparatus 100 is provided with a drive section 130 which drives the damping force control valves 240.

The derivation section 110 differentiates an output value from the stroke sensor 31 to thereby calculate the front wheel-side stroke velocity Vpf. In addition, the derivation section 110 differentiates an output value from the stroke sensor 32 to thereby calculate the rear wheel-side stroke velocity Vpr. The stroke velocity Vpf and the stroke velocity Vpr may be generically referred to as "stroke velocity Vp". Incidentally, details of the derivation section 110 will be described later.

The setting section 120 sets the front wheel-side target current Itf fed to the solenoid of the damping force control valve 240 of the damping device 21d, based on the aforementioned stroke velocity Vpf. In addition, the setting section 120 sets the rear wheel-side target current Itr fed to the solenoid of the damping force control valve 240 of the damping device 22d, based on the aforementioned stroke velocity Vpr. Incidentally, a technique of setting the target current Itf by the setting section 120 and a technique of setting the target current Itr by the setting section 120 are similar or the same. In the following description, the target current Itf and the target current Itr may be generically referred to as "target current It".

Incidentally, the setting section 120 can be grasped as a damping force control section for controlling the damping force of each suspension based on each stroke velocity.

The drive section 130 is provided with a transistor (Field Effect Transistor: FET) as a switching element, which is, for example, connected between a positive electrode side of a power supply and each of coils of the solenoids of the damping force control valves 240. The drive section 130 drives a gate of the transistor to enable the transistor to perform a switching operation to thereby control drive of the damping force control valve 240.

Figure 4:
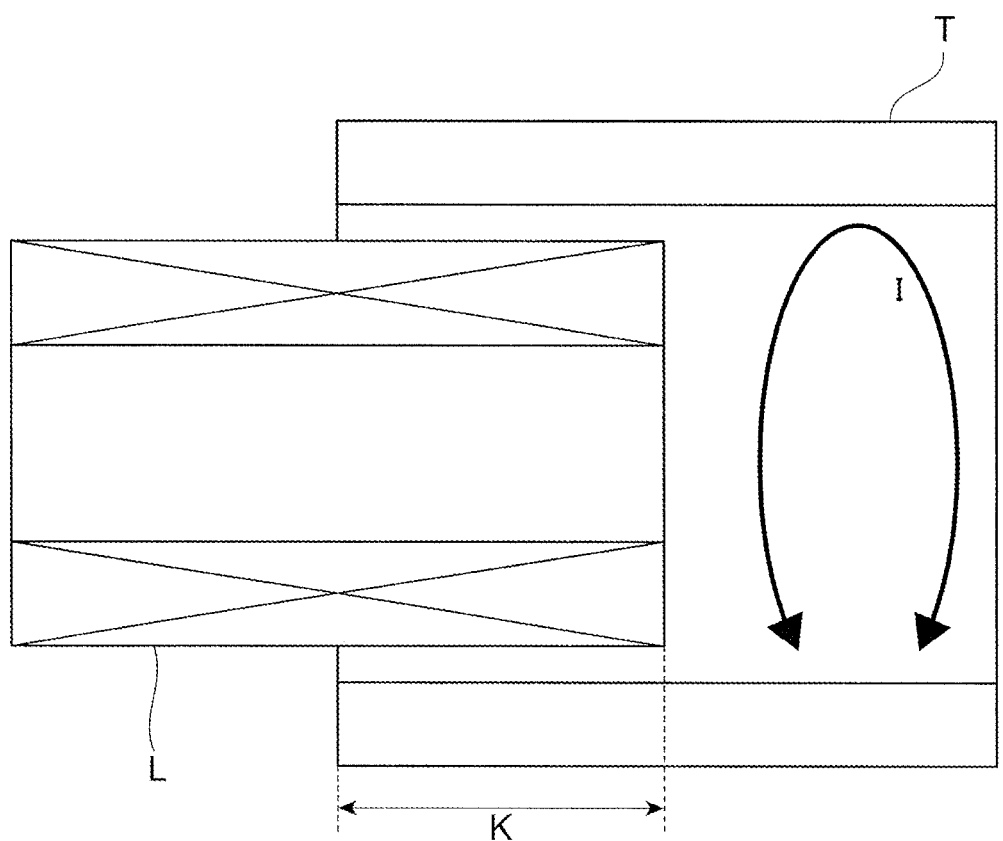
FIG. 4 is a view for explaining an operating principle of a stroke sensor according to the present embodiment.

FIG. 4 is a view for explaining an operating principle of the stroke sensor 30 according to the present embodiment.

A case where a fitting length (overlapping length) between a cylindrical conductor T and a coil L fitted to each other is expressed as K is shown in an example illustrated in FIG. 4.

Here, the conductor T can be regarded as the piston 221. The coil L can be regarded as a coil incorporated into the cylinder 210. In this case, the fitting length K corresponds to an overlapping length in an up/down direction between the piston 221 and the coil incorporated into the cylinder 210. In addition thereto, for example, one of two members moving during extension/compression of the suspension and in accordance therewith may be used as the conductor, and the coil may be provided on the other member. Incidentally, the inside/outside arrangement between the conductor T and the coil L is reverse to the inside/outside arrangement between the piston 221 and the coil incorporated into the cylinder 210, as shown in FIG. 2 and FIG. 4. However, this difference does not affect the description mentioned here.

The fitting length K varies according to a stroke amount of the suspension. When the suspension is extended, the fitting length K is shorter. When the suspension is compressed, the fitting length K is longer.

When an alternating current is made to flow into the coil L on this occasion, an eddy current I occurs in the conductor T so as to cancel fluctuation of a magnetic field. When the eddy current I occurs, intensity of the magnetic field generated around the coil L is weakened by the effect of the eddy current I. That is, inductance of the coil L is apparently reduced by the eddy current I. When the fitting length K is shorter (when the suspension is extended), the inductance is larger because the influence of the eddy current I is smaller. On the other hand, when the fitting length K is longer (when the suspension is compressed), the inductance is smaller because the influence of the eddy current I is larger.

A resonance frequency of an LC oscillation circuit changes according to the inductance of the coil L. Specifically, a relation $f_0=1/(2\pi\sqrt{(LC)})$ is satisfied among the resonance frequency $f_0$, the inductance L of the coil and a capacitance C of a capacitor. That is, as the inductance of the coil L is larger, the resonance frequency is lower. On the other hand, as the inductance of the coil L is smaller, the resonance frequency is higher. Accordingly, it is possible to obtain a stroke amount of the suspension from the resonance frequency.

The resonance frequency according to the present embodiment is, for example, 30 kHz (when the suspension is largest in length) to 60 kHz (when the suspension is shortest in length) so that the maximum resonance frequency is about twice as high as the minimum resonance frequency.

(Derivation Section 110)

Figure 5:
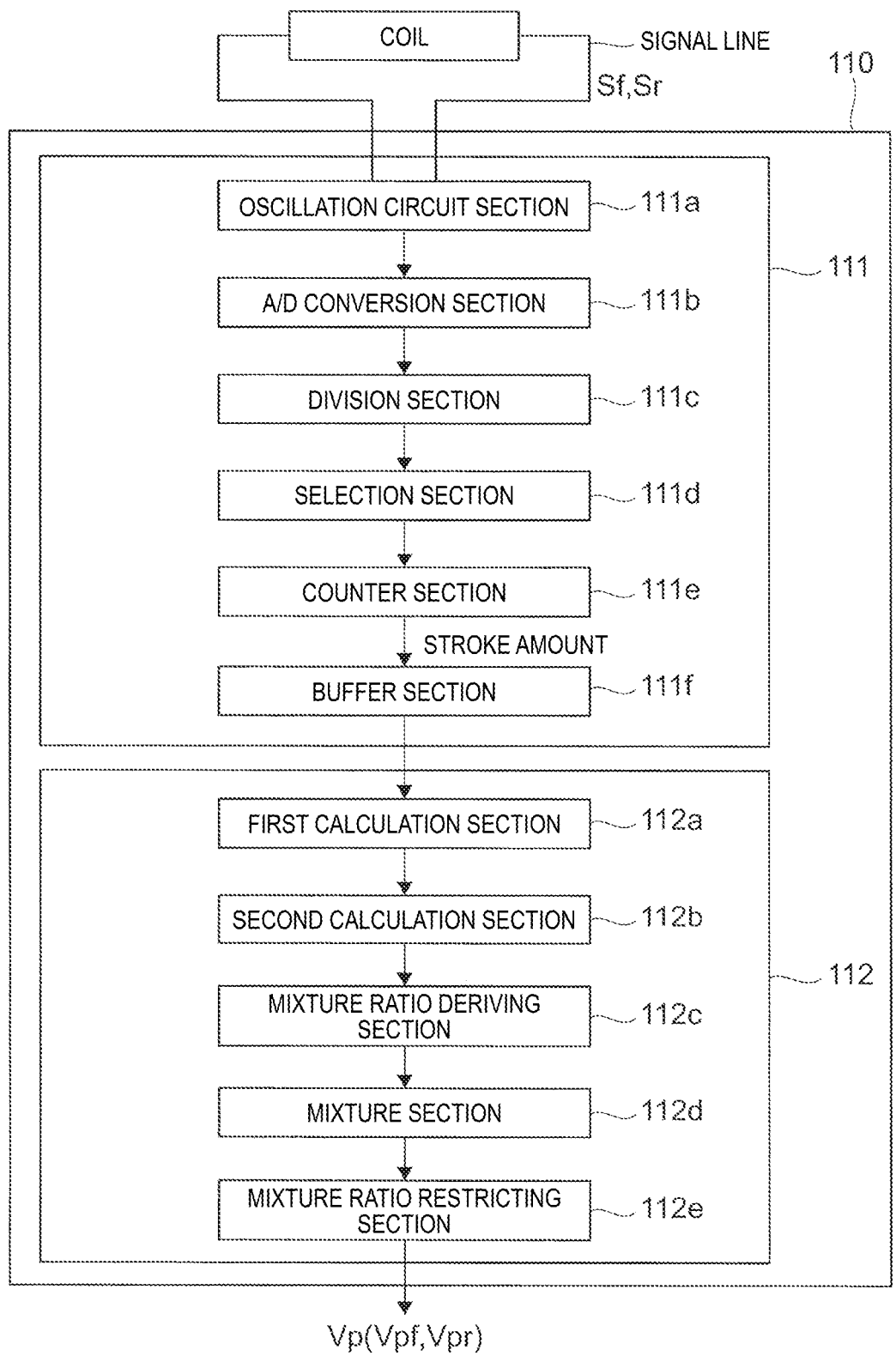
FIG. 5 is a block diagram for explaining a configuration of a stroke velocity calculation section according to the present embodiment.

FIG. 5 is a block diagram for explaining the configuration of the derivation section 110 according to the present embodiment.

The derivation section 110 illustrated in FIG. 5 is provided with an acquisition section 111 and a calculation section 112. The acquisition section 111 acquires a stroke amount which is a movement amount (an extension/compression amount) when the aforementioned piston 221 and the coil incorporated into the cylinder 210 move relatively to each other. The calculation section 112 calculates a stroke velocity Vp based on the stroke amount.

The acquisition section 111 is provided with an oscillation circuit section 111a, an A/D conversion section 111b, a division section 111c, a selection section 111d, a counter section 111e, and a buffer section 111f.

The oscillation circuit section 111a is provided with the capacitor which is electrically connected to the aforementioned coil through a signal line to configure the LC oscillation circuit. An alternating current of a predetermined resonance frequency is outputted from the LC oscillation circuit. In the present embodiment, the resonance frequency changes according to the stroke amount of the suspension.

The A/D conversion section 111b shapes an oscillation waveform outputted from the oscillation circuit section 111a into a shaped waveform in which an analog signal has been converted into a digital signal. The A/D conversion section 111b serves as a comparator which converts the analog signal into the 1-bit digital signal.

The division section 111c performs frequency division on the digital signal converted by the A/D conversion section 111b, so as to obtain a frequency-divided waveform.

Figure 6A:
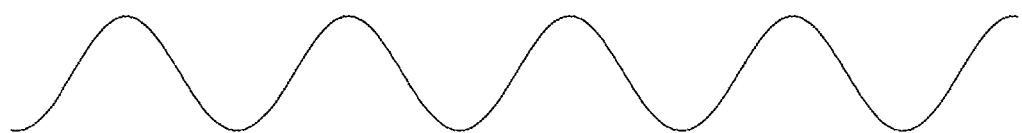
FIG. 6A is a view showing an oscillation waveform outputted from an oscillation circuit section.
Figure 6B:
FIG. 6B is a view showing a shaped waveform shaped by an A/D conversion section.
Figure 6C:
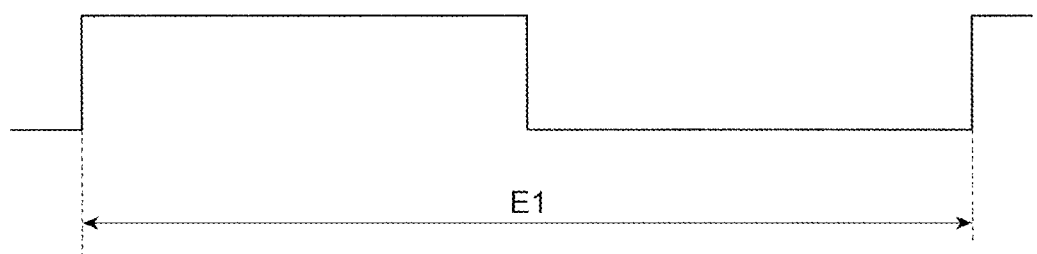
FIG. 6C is a view showing a frequency-divided waveform subjected to frequency division by a division section.

FIG. 6A is a view showing an example of the oscillation waveform outputted from the oscillation circuit section 111a. FIG. 6B is a view illustrating an example of the shaped waveform shaped by the A/D conversion section 111b. FIG. 6C is a view illustrating of the frequency-divided waveform subjected to frequency division by the division section 111c.

As shown in FIG. 6B, the shaped waveform is one and the same in frequency as the oscillation waveform but shaped from a sinusoidal waveform into a rectangular waveform. In addition, as shown in FIG. 6C, the frequency-divided waveform remains rectangular, but the frequency of the frequency-divided waveform is reduced by the frequency division.

The division section 111c performs frequency division, for example, with four division ratios and outputs four frequency-divided waveforms. Each division ratio is, for example, expressed as $2^n$ (n is an integer) and selected from 1 to 4,096. In the present embodiment, 32 ($=2^5$), 64 ($=2^6$), 128 ($=2^7$) and 256 ($=2^8$) are selected as the division ratios.

For example, a binary counter may be used as each of the A/D conversion section 111b and the division section 111c.

The selection section 111d selects one from the frequency-divided waveforms outputted from the division section 111c.

By the selection section 111d selecting the frequency-divided waveform, the frequency of the frequency-divided waveform can be made to fall into a relatively narrow range even when the frequency of the oscillation waveform outputted from the oscillation circuit section 111a fluctuates largely and a dynamic range is wide.

In addition, responsiveness of the stroke sensor hardly changes. That is, when the frequency is higher, cycles are measured an increasing number of times by the counter section 111e which will be described later. When the frequency is lower, cycles are measured a reduced number of times by the counter section 111e. For this reason, stroke amounts are outputted an increasing number of times or a reduced number of times by the counter section 111e which will be described later. As a result, the responsiveness as the stroke sensor changes. The change can be reduced by the selection section 111d selecting the frequency-divided waveform. In practice, a predetermined threshold for the cycle of the frequency-divided waveform is set, and the selection section 111d selects the frequency-divided waveform based on the threshold.

Practically, it is preferable that the frequency of the frequency-divided waveform falls into a range of about 300 Hz to 2000 Hz.

For example, a multiplexer can be used as the selection section 111d.

The counter section 111e makes a counter using a crystal resonator etc. count an edge interval of the frequency-divided waveform selected by the selection section 111d.

From a number counted thus, the counter section 111e measures a cycle of the edge interval of the frequency-divided waveform. The edge interval can be, for example, set as an interval of a cycle of the frequency-divided waveform designated by E1 in FIG. 6C. Accordingly, in this case, the counter section 111e calculates a period of time corresponding to the cycle of the frequency-divided waveform. The period of time can be considered as a parameter expressing a stroke amount. Accordingly, it can be considered that the counter section 111e acquires the stroke amount by calculating the period of time.

The buffer section 111f stores a predetermined number of periods of time each corresponding to a cycle measured by the counter section 111e in a descending order from the most recent period of time. For example, the buffer section 111f may be a ring buffer. In this case, as soon as a period of time corresponding to a cycle measured newly is stored, a period of time corresponding to a cycle measured at the oldest time is deleted.

Return to FIG. 5. The calculation section 112 is provided with a first calculation section 112a, a second calculation section 112b, a mixture ratio deriving section 112c, a mixture section 112d, and a mixture ratio restricting section 112e.

The first calculation section 112a calculates a first stroke velocity by differentiating the stroke amount by use of a first time constant as a time constant.

In addition, the second calculation section 112b calculates a second stroke velocity by differentiating the stroke amount by use of a second time constant larger than the first time constant as a time constant.

Figure 7A:
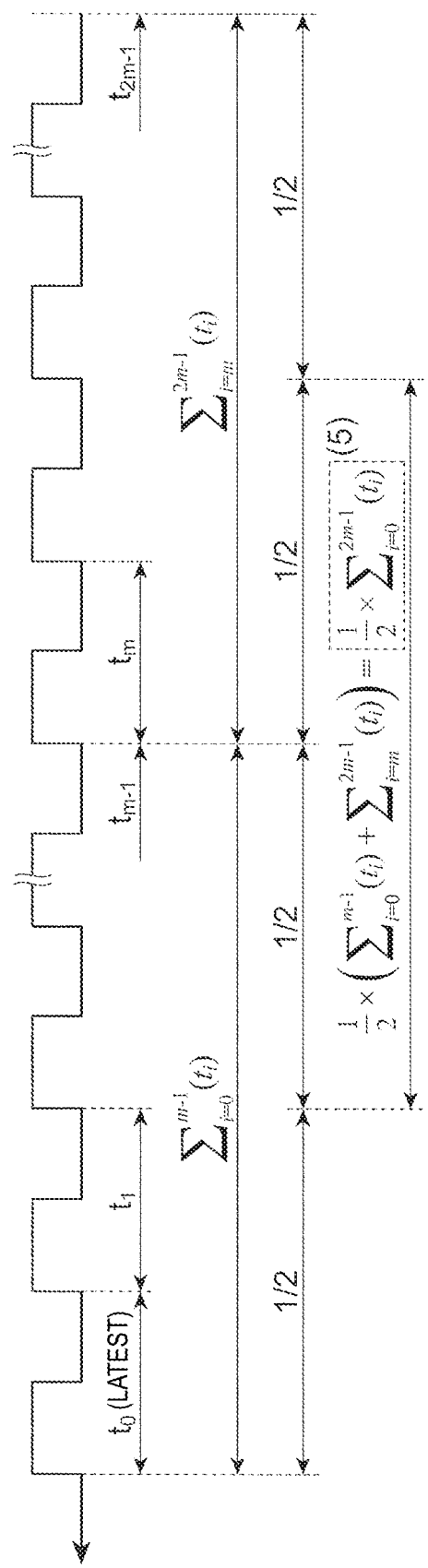
FIG. 7A is a view showing a method of differentiating a stroke amount by a first stroke velocity calculation section and a second stroke velocity calculation section.

FIG. 7A and FIG. 7B are views showing a method of differentiating the stroke amount by the first calculation section 112a and the second calculation section 112b.

Of them, FIG. 7A shows the frequency-divided waveform illustrated in FIG. 6C, and FIG. 7B shows a numerical expression in accordance with which the stroke amount is differentiated.

Each of the first calculation section 112a and the second calculation section 112b refers to the buffer section 111f to thereby acquire 2m periods of time (corresponding to 2m cycles) each corresponding to a cycle in a descending order from the most recent period of time. FIG. 7A shows an example in which m periods of time from $t_0$ to $t_{m-1}$ and m periods of time from $t_m$ to $t_{2m-1}$, i.e. 2m periods of time in total, are acquired as periods of time each corresponding to a cycle in the descending order from the most recent period of time. As shown in FIG. 7B, a difference (time (3)) between the total time (time (1)) from $t_0$ to $t_{m-1}$ and the total time (time (2)) from $t_m$ to $t_{2m-1}$ is calculated. The difference is considered as a variation of time generated during the m cycles within half (time (5) indicated in FIG. 7A) of the total time (time (4)) from $t_0$ to $t_{2m-1}$. Accordingly, time (6) obtained by dividing the time (3) by the time (5) expresses a variation of time generated in the m cycles. By further dividing the time (6) by m, a variation of time per cycle (time (7)) can be calculated. That is, the stroke amount can be differentiated in this manner.

Further, when the time (7) is multiplied by a coefficient Kvp having a velocity dimension, the time (7) is converted into a physical quantity of velocity. Thus, a stroke velocity Vpm is obtained.

Each of the first calculation section 112a and the second calculation section 112b calculates the stroke velocity by differentiating the stroke amount in the aforementioned manner. On this occasion, the time constant used by the first calculation section 112a is different from the time instant used by the second calculation section 112b. Each of the time constants can be expressed as a number m in the aforementioned example. That is, it can be considered that as the number m is smaller, the time constant is smaller, and that as the number m is larger, the time constant is larger. In the present embodiment, for example, m is selected from a range of 1 to 16. Hereinafter, m selected by the first calculation section 112a may be referred to as "m1" and m selected by the second calculation section 112b may be referred to as "m2".

Here, the first calculation section 112a uses a first time constant, which is smaller, as the time constant. Therefore, for example, the first calculation section 112a sets m1=2. On the other hand, the second calculation section 112b uses a second time constant, which is larger than the first time constant. Therefore, the second calculation section 112b sets m2=8 as the number larger than m1.

Thus, in the present embodiment, the first calculation section 112a differentiates the stroke amount by use of the first time constant to thereby obtain a first stroke velocity Vpm1 as the aforementioned stroke velocity Vpm. In addition, the second calculation section 112b differentiates the stroke amount by use of the second time constant to thereby obtain a second stroke velocity Vpm2 as the aforementioned stroke velocity Vpm.

The mixture ratio deriving section 112c obtains a mixture ratio Kt determined based on the first stroke velocity Vpm1.

The mixture section 112d calculates a final stroke velocity Vp by calculating a weighted average of the first stroke velocity Vpm1 and the second stroke velocity Vpm2 by use of the mixture ratio Kt obtained by the mixture ratio deriving section 112c. When the final stroke velocity Vp is calculated thus, the final stroke velocity Vp can be treated as a continuous numerical value after a region in which resolution power or responsiveness is regarded as important has been set within an assumed velocity range. The mixture ratio Kt expresses a mixture ratio of the first stroke velocity Vpm1. That is, it can be considered that the mixture velocity Kt is a weight for the first stroke velocity Vpm1 when the final stroke velocity Vp is calculated. Incidentally, in this case, a mixture ratio of the second stroke velocity Vpm2 (a weight for the second stroke velocity Vpm2) can be set as 1−Kt.

Figures 8A, 8B:
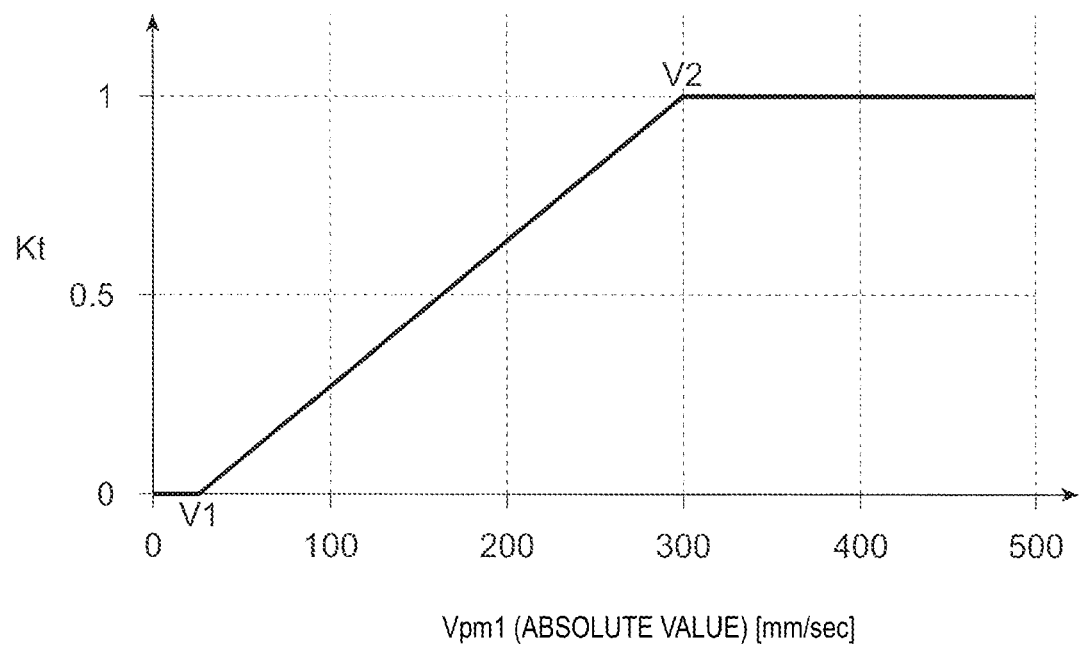
FIG. 8A is a view showing a method of obtaining a mixture ratio by a mixture ratio deriving section.
FIG. 8B is a view showing a numerical expression in accordance with which a mixture section calculates a weighted average of a first stroke velocity and a second stroke velocity by use of the mixture ratio to thereby obtain a final stroke velocity.

FIG. 8A is a graph showing a method of obtaining the mixture ratio Kt by the mixture ratio deriving section 112c. In FIG. 8A, the abscissa expresses absolute value of the first stroke velocity Vpm1, and the ordinate expresses the mixture ratio Kt.

FIG. 8B is a view showing a numerical expression in accordance with which the mixture section 112d calculates the weighted average of the first stroke velocity Vpm1 and the second stroke velocity Vpm2 by use of the mixture ratio Kt to thereby obtain the final stoke velocity Vp.

As shown in FIG. 8A, the mixture ratio Kt is 0 in a region where the first stroke velocity Vpm1 is lower than a velocity V1. That is, in this region, the mixture ratio of the first stroke velocity Vpm1 is 0 and the mixture ratio of the second stroke velocity Vpm2 is 1. As a result, according to the numerical expression in FIG. 8B, the second stroke velocity Vpm2 becomes the stroke velocity Vp directly.

In addition, the mixture ratio Kt is 1 in a region where the first stroke velocity Vpm1 is not lower than a velocity V2. That is, in the region, the mixture ratio of the first stroke velocity Vpm1 is 1 and the mixture ratio of the second stroke velocity Vpm2 is 0. As a result, according to the numerical expression in FIG. 8B, the first stroke velocity Vpm1 becomes the stroke velocity Vp directly.

Further, the mixture ratio Kt changes linearly in a region (mixture region) where the first stroke velocity Vpm1 is not lower than the velocity V1 but lower than the velocity V2.

When the first stroke velocity Vpm1 increases in the region, the mixture ratio Kt increases linearly. That is, when the first stroke velocity Vpm1 increases, the mixture ratio of the first stroke velocity Vpm1 becomes larger and the mixture ratio of the second stroke velocity Vpm2 becomes smaller.

In the present embodiment, the stroke velocity Vp is calculated based on the first stroke velocity Vpm1 and the second stroke velocity Vpm2 as described above. Thus, compatibility between responsiveness and accuracy can be achieved when the stroke velocity Vp is obtained based on the stroke amount.

That is, when motion of the suspension is so slow that the first stroke velocity Vpm1 is small, the mixture ratio of the second stroke velocity Vpm2 is larger. That is, the stroke velocity Vp including the larger ratio of the second stroke velocity Vpm2 obtained in a state in which the time constant is larger is calculated. When the motion of the suspension is slow, responsiveness is not requested so much. Accordingly, in this case, the mixture section 112d calculates the stroke velocity Vp in which accuracy is regarded as more important than responsiveness.

On the other hand, when motion of the suspension is so fast that the first stroke velocity Vpm1 is large, the mixture ratio of the first stroke velocity Vpm1 is larger. That is, the stroke velocity Vp including the larger ratio of the first stroke velocity Vpm1 obtained in a state in which the time constant is smaller is calculated. When the motion of the suspension is fast, responsiveness is requested more than accuracy. Accordingly, in this case, the mixture section 112d calculates the stroke velocity Vp in which responsiveness is regarded as more important than accuracy.

When the mixture ratio Kt which has been newly obtained has a difference not smaller than a predetermined value with respect to the mixture ratio Kt which was previously obtained, the mixture ratio restricting section 112e restricts a change amount of the mixture ratio Kt which has been newly obtained. Thus, it is possible to cancel distortion of the final stroke velocity Vp caused by the difference between Vpm1 and Vpm2 within the mixture range during acceleration or deceleration of the stroke.

On this occasion, the mixture ratio restricting section 112e places a restriction on the change amount of the mixture ratio Kt when the stroke velocity decreases with time, and a restriction on the change amount of the mixture ratio Kt when the stroke velocity increases with time.

FIG. 9A and FIG. 9B show numerical expressions for explaining operations of the mixture ratio restricting section 112e.

Of them, FIG. 9A shows a case when the stroke velocity decreases with time, and FIG. 9B shows a case when the stroke velocity increases with time.

Here, the newly obtained mixture ratio Kt (Ktn0 (Kt current value)) and the previously obtained mixture ratio Kt (Ktn1 (Kt previous value)) are compared with each other. In the present embodiment, the first stroke velocity Vpm1 and the second stroke velocity Vpm2 are, for example, obtained every millisecond, and the mixture ratio Kt is also calculated every millisecond. Accordingly, the newly obtained mixture ratio Kt is calculated one millisecond later than the previously obtained mixture ratio Kt.

Assume that the stroke velocity decreases with time, as shown in FIG. 9A. In this case, when the difference exceeds KT_DECREASE (when Ktn0 (Kt current value)<Ktn1 (Kt previous value)−KT_DECREASE is established), Ktn1 (Kt previous value)−KT_DECREASE is set as the mixture ratio Kt.

On the other hand, when the difference does not exceed KT_DECREASE (when Ktn0 (Kt current value)<Ktn1 (Kt previous value)−KT_DECREASE is not established), Ktn0 (Kt current value) is set as the mixture ratio Kt. That is, in this case, the change amount of the mixture ratio Kt is restricted to be not larger than KT_DECREASE. When the stroke velocity decreases with time, distortion of the final stroke velocity Vp caused by Vpm1 smaller than Vpm2 in the mixture range can be cancelled by the restriction on the change amount of the mixture ratio Kt.

Assume that the stroke velocity increases with time, as shown in FIG. 9B. In this case, when the difference exceeds KT_INCREASE (when Ktn0 (Kt current value)>Ktn1 (Kt previous value)+KT_INCREASE is established), Ktn1 (Kt previous value)+KT_INCREASE is set as the mixture ratio Kt.

On the other hand, when the difference does not exceed KT_INCREASE (when Ktn0 (Kt current value)>Ktn1 (Kt previous value)+KT_INCREASE is not established), Ktn0 (Kt current value) is set as the mixture ratio Kt. That is, in this case, the change amount of the mixture ratio Kt is restricted to be not larger than KT_INCREASE. When the stroke velocity increases with time, distortion of the final stroke velocity Vp caused by Vpm2 smaller than Vpm1 in the mixture range can be cancelled by the restriction on the change amount of the mixture ratio Kt.

Figure 10A:
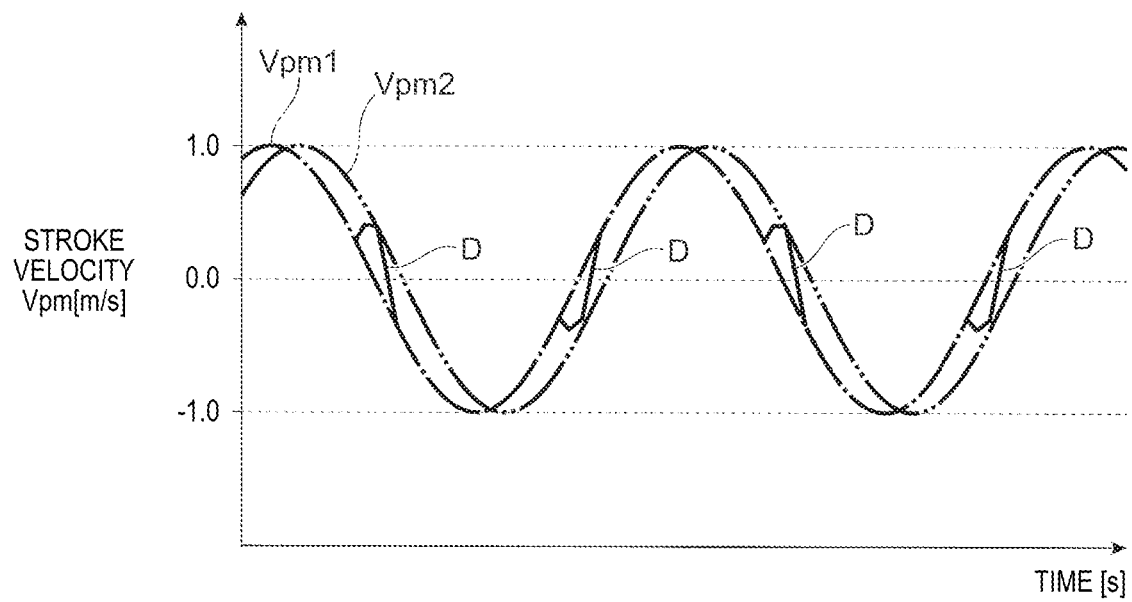
FIG. 10 A is a graph for making comparison between a case where a restriction is not placed on a change amount of the mixture ratio which has been newly obtained and a case where the restriction is placed on the change amount of the mixture ratio which has been newly obtained.
FIG. 10B is a graph for making comparison between the case where the restriction is not placed on the change amount of the mixture ratio which has been newly obtained and the case where the restriction is placed on the change amount of the mixture ratio which has been newly obtained.
Figure 10B:
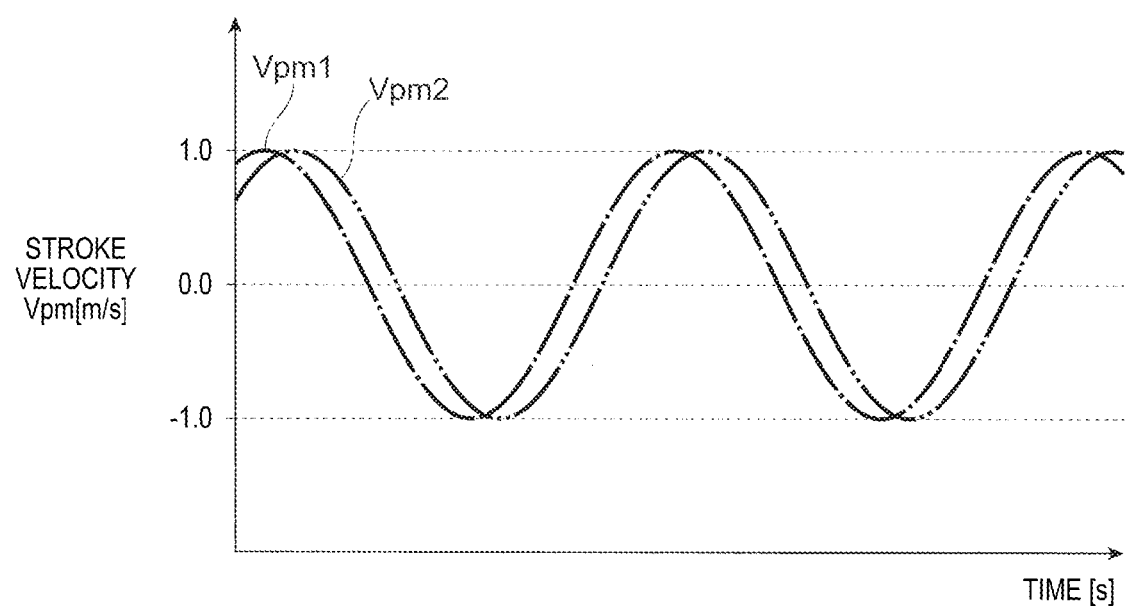

FIG. 10A and FIG. 10B are graphs for making comparison between a case where the restriction is not placed on the change amount of the newly obtained mixture ratio Kt and a case where the restriction is placed on the change amount of the newly obtained mixture ratio Kt. In FIG. 10A and FIG. 10B, the abscissa expresses time and the ordinate expresses the first stroke velocity Vpm1 and the second stroke velocity Vpm2. In addition, each of FIG. 10A and FIG. 10B shows a case where 25.46 Hz oscillation was applied to the suspension and each of the first stroke velocity Vpm1 and the second stroke velocity Vpm2 had a maximum velocity of 1 m/s as absolute value.

Of them, FIG. 10A illustrates changes of the first stroke velocity Vpm1 and the second stroke velocity Vpm2 in the case where the change amount of the newly obtained mixture ratio Kt is not restricted and the stroke velocity Vp after the first stroke velocity Vpm1 and the second stroke velocity Vpm2 have been mixed. As described above, the first stroke velocity Vpm1 is a result obtained using the first time constant, which is smaller, as the time constant, and the second stroke velocity Vpm2 is a result obtained using the second time constant, which is larger, as the time constant. Accordingly, in this case, the first stroke velocity Vpm1 and the second stroke velocity Vpm2 change in the same manner but the latter is later than the former. The time difference between the both is, for example, 2 milliseconds to 3 milliseconds.

As shown in FIG. 10A, the stroke velocity Vp after the first stroke velocity Vpm1 and the second stroke velocity Vpm2 have been mixed in accordance with the rule shown in FIG. 9B is mostly consistent with the first stroke velocity Vpm1 but has places where protrusions D are generated as illustrated in FIG. 10A. This is caused as a result of the mixture of the first stroke velocity Vpm1 and the second stroke velocity Vpm2 in the mixture region shown in FIG. 8A. In this state, control of damping force of the suspension is apt to be brought into a discontinuous state. Accordingly, ride comfortability is apt to be degraded.

On the other hand, FIG. 10B illustrates changes of the first stroke velocity Vpm1 and the second stroke velocity Vpm2 in the case where the change amount of the newly obtained mixture ratio Kt is restricted and the stroke velocity Vp after the first stroke velocity Vpm1 and the second stroke velocity Vpm2 have been mixed. In the example shown in FIG. 10B, the stroke velocity Vp after the first stroke velocity Vpm1 and the second stroke velocity Vpm2 have been mixed is mostly consistent with the first stroke velocity Vpm1 but the aforementioned protrusions D are extinguished.

On this occasion, assume that KT_DECREASE is, for example, 0.01, and KT_INCREASE is, for example, 1. That is, the mixture ratio restricting section 112e makes a degree of the restriction in the case where the stroke velocity decreases with time different from a degree of the restriction in the case where the stroke velocity increases with time. Thus, the degrees can be set respectively and reflected in the final stroke velocity Vp as if an inertia were given to the arithmetic result of Vpm1 during deceleration and the arithmetic result of Vpm2 during acceleration. Here, the degree of the restriction in the latter case is made larger than the degree of the restriction in the former case. Thus, as the stroke velocity increases with time, the restriction is generated more difficulty. That is, in this case, the stroke velocity changes in a direction in which more responsiveness is requested. Accordingly, it is preferable that importance is attached to responsiveness and the restriction is generated more difficulty. On the other hand, as the stroke velocity decreases with time, the stroke velocity changes in a direction in which less responsiveness is requested. Accordingly, the restriction is generated more easily. Thus, the damping force of the suspension can be controlled continuously so that ride comfortability is more improved.

(Modification)

Incidentally, the motorcycle 1 has been illustrated and described as a vehicle in the aforementioned example. However, the present invention is not limited thereto but may be applied to a case of another vehicle such as a four-wheeler or a three-wheeler.

Further, in the aforementioned example, the stroke velocity is obtained by differentiating the stroke amount. Therefore, the stroke velocity is used for control of the damping force of the suspension. The subject to which the present invention is applied is not limited thereto. That is, the present embodiment can be applied to any apparatus as long as the apparatus has to obtain a differential amount. For example, the present embodiment can be applied to an apparatus which differentiates a displacement to thereby obtain a velocity as a differential amount or which differentiates a velocity to thereby obtain an acceleration as a differential amount.

Figure 11:
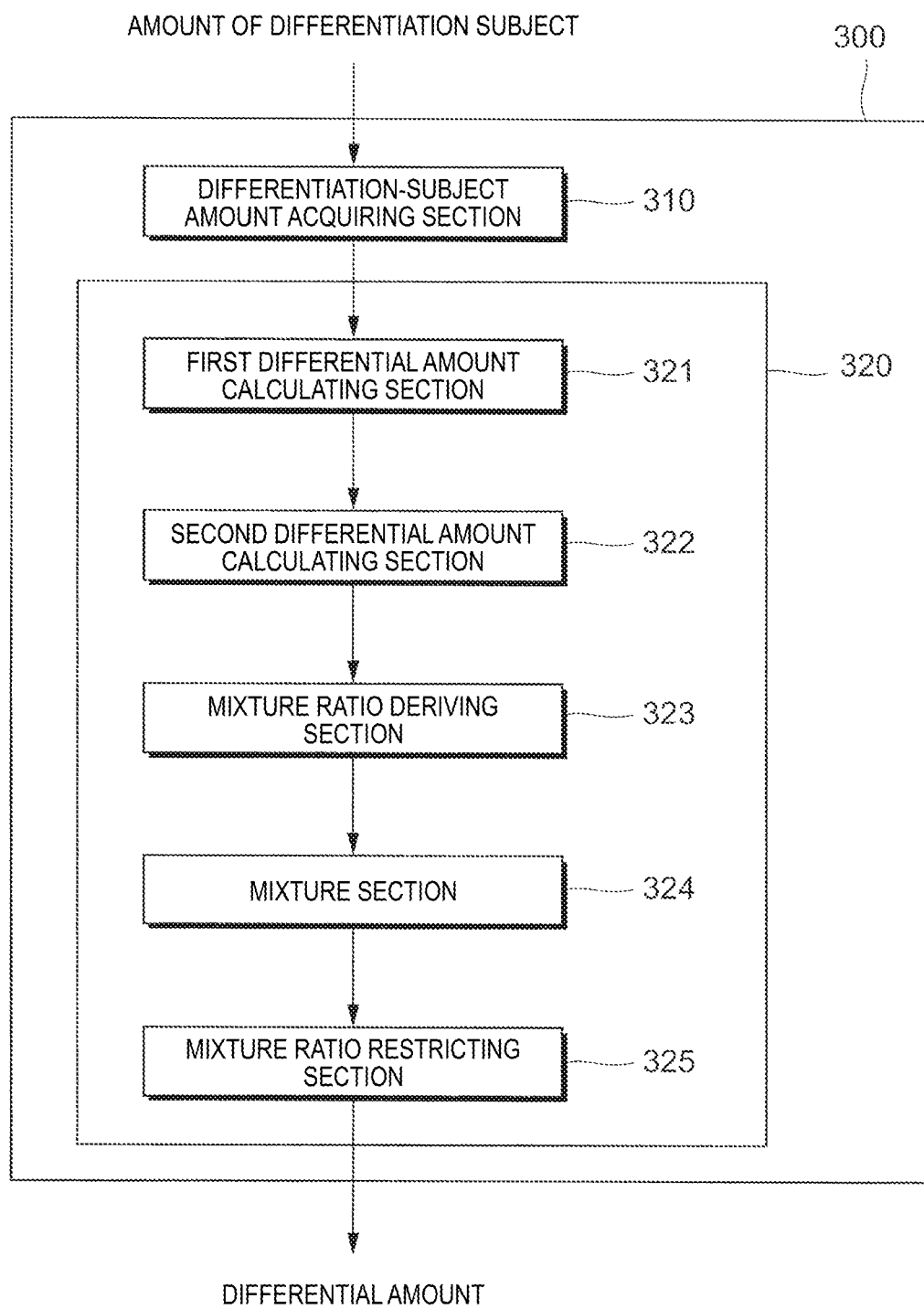
FIG. 11 is a diagram showing a differential amount calculation apparatus for obtaining a differential amount.

FIG. 11 is a diagram showing a differential amount calculation apparatus for obtaining a differential amount.

As illustrated in FIG. 11, the differential amount calculation apparatus 300 according to the present embodiment is provided with a differentiation-subject amount acquiring section 310 and a differential amount calculating section 320.

The differentiation-subject amount acquiring section 310 acquires an amount of a differentiation subject, which changes with time and serves as a subject of differentiation. For example, when the aforementioned stroke amount is differentiated in order to obtain a stroke velocity, the stroke amount corresponds to the amount of the differentiation subject. In addition, when a displacement is differentiated in order to obtain a velocity, the displacement corresponds to the amount of the differentiation subject. Further, when the velocity is further differentiated in order to obtain an acceleration, the velocity corresponds to the amount of the differentiation subject.

The differential amount calculating section 320 differentiates the amount of the differentiation subject, to thereby calculate a differential amount.

In the present embodiment, the differential amount calculating section 320 is provided with a first differential amount calculating section 321, a second differential amount calculating section 322, a mixture ratio deriving section 323, a mixture section 324, and a mixture ratio restricting section 325.

The first differential amount calculating section 321 differentiates the amount of the differentiation subject by use of a first time constant as a time constant, to thereby calculate a first differential amount. The first differential amount calculating section 321 has a similar function to or the same function as the first calculation section 112a in FIG. 5.

The second differential amount calculating section 322 differentiates the amount of the differentiation subject by use of a second time constant larger than the first time constant as a time constant, to thereby calculate a second differential amount. The second differential amount calculating section 322 has a similar function to or the same function as the second calculation section 112b in FIG. 5.

The mixture ratio deriving section 323 obtains a mixture ratio determined based on the first differential amount. The mixture ratio deriving section 323 has a similar function to or the same function as the mixture ratio deriving section 112c in FIG. 5.

The mixture section 324 calculates a weighted average of the first differential amount and the second differential amount using the mixture ratio obtained by the mixture ratio deriving section 323, to thereby calculate a differential amount. The mixture section 324 has a similar function to or the same function as the mixture section 112d in FIG. 5.

When a newly obtained mixture ratio has a difference not smaller than a predetermined value with respect to a previously obtained mixture ratio, the mixture ratio restricting section 325 restricts a change amount of the newly obtained mixture ratio. The mixture ratio restricting section 325 has a similar function to or the same function as the mixture ratio restricting section 112e in FIG. 5. Accordingly, the mixture ratio restricting section 325 places a restriction on the change amount of the mixture ratio when the differential amount decreases with time, and a restriction on the change amount of the mixture ratio when the differential amount increases with time. In addition, the mixture ratio restricting section 325 makes a degree of the restriction when the differential amount decreases with time different from a degree of the restriction when the differential amount increases with time.

In addition, processing performed by the derivation section 110 or the differential amount calculation apparatus 300 in the present embodiment is carried out, for example, by software and hardware resources cooperating with each other. That is, the processing can be carried out when a not-shown CPU in a control computer provided in the derivation section 110 or the differential amount calculation apparatus 300 executes a program for implementing various functions of the derivation section 110 or the differential amount calculation apparatus 300.

Therefore, the present embodiment may be also grasped as a computer-readable non-transitory recording medium having such a program recorded therein. In this case, the recording medium is not particularly restricted as long as the recording medium can store the program. For example, a CD-ROM, a hard disk, a memory card, or the like may be used as the recording medium.

Figure 12:
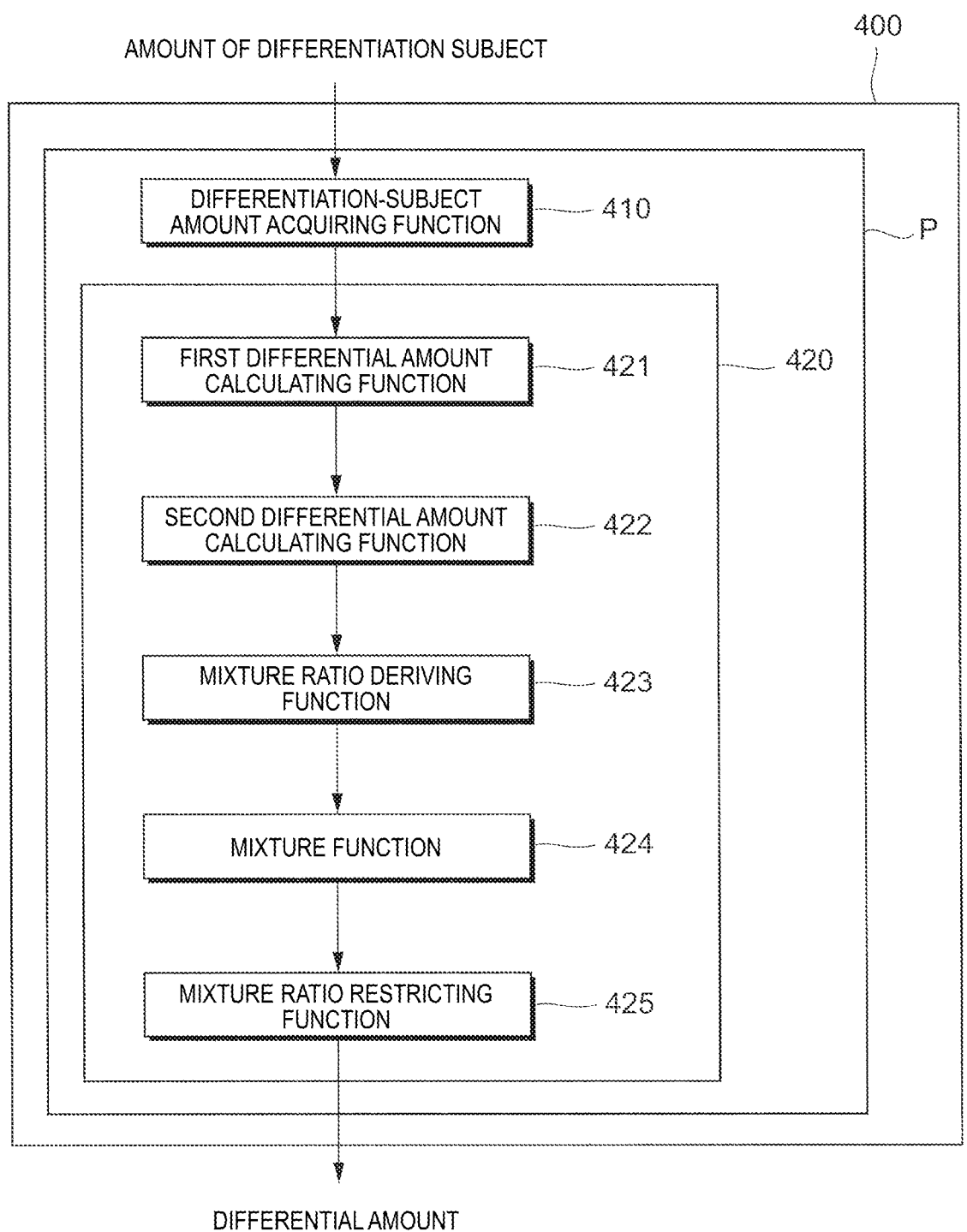
FIG. 12 is a diagram showing a recording medium according to the present embodiment.

FIG. 12 is a diagram showing the recording medium according to the present embodiment.

As illustrated in FIG. 12, the recording medium 400 according to the present embodiment stores a program P. The program P is provided with a differentiation-subject amount acquiring function 410 and a differential amount calculating function 420.

The differentiation-subject amount acquiring function 410 acquires an amount of a differentiation subject, which changes with time and serves as a subject of differentiation. The differentiation-subject amount acquiring function 410 is a module carrying out the function of the differentiation-subject amount acquiring section 310 in FIG. 11.

The differential amount calculating function 420 differentiates the amount of the differentiation subject, to thereby calculate a differential amount. The differential amount calculating function 420 is a module carrying out the function of the differential amount calculating section 320 in FIG. 11.

In the present embodiment, the differential amount calculating function 420 is provided with a first differential amount calculating function 421, a second differential amount calculating function 422, a mixture ratio deriving function 423, a mixture function 424, and a mixture ratio restricting function 425.

The first differential amount calculating function 421 differentiates the amount of the differentiation subject by use of a first time constant as a time constant, to thereby calculate a first differential amount. The first differential amount calculating function 421 is a module carrying out the function of the first differential amount calculating section 321 in FIG. 11.

The second differential amount calculating function 422 differentiates the amount of the differentiation subject by use of a second time constant larger than the first time constant as a time constant, to thereby calculate a second differential amount. The second differential amount calculating function 422 is a module carrying out the function of the second differential amount calculating section 322 in FIG. 11.

The mixture ratio deriving function 423 obtains a mixture ratio determined based on the first differential amount. The mixture ratio deriving function 423 is a module carrying out the function of the mixture ratio deriving section 323 in FIG. 11.

The mixture function 424 calculates a weighted average of the first differential amount and the second differential amount by use of the mixture ratio obtained by the mixture ratio deriving function 423, to thereby calculate a differential amount. The mixture function 424 is a module carrying out the function of the mixture section 324 in FIG. 11.

When a newly obtained mixture ratio has a difference not smaller than a predetermined value with respect to a previously obtained mixture ratio, the mixture ratio restricting function 425 restricts a change amount of the newly obtained mixture ratio. The mixture ratio restricting function 425 is a module carrying out the function of the mixture ratio restricting section 325 in FIG. 11. Accordingly, the mixture ratio restricting function 425 places a restriction on the change amount of the mixture ratio when the differential amount decreases with time and a restriction on the change amount of the mixture ratio when the differential amount increases with time. In addition, the mixture ratio restricting function 425 makes a degree of the restriction when the differential amount decreases with time different from a degree of the restriction when the differential amount increases with time.

Incidentally, in the aforementioned example, the present invention may be also grasped as a suspension system having suspension apparatuses (suspensions) for damping vibration propagated from wheels, and a control apparatus 100 for controlling damping forces of the suspensions.

Figure 13:
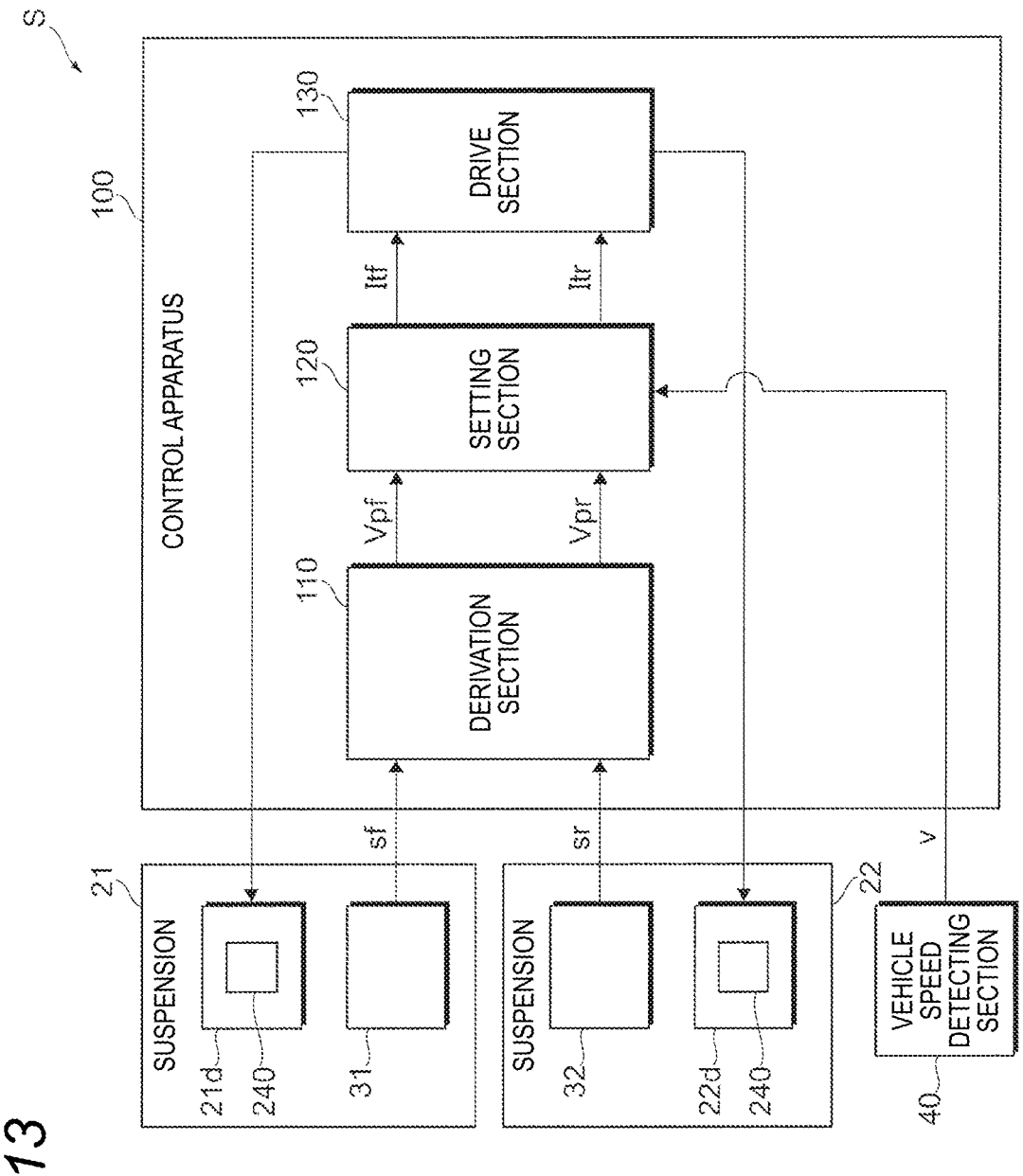
FIG. 13 is a diagram for explaining a suspension system according to the present embodiment.

FIG. 13 is a diagram for explaining the suspension system according to the present embodiment.

The suspension system S illustrated in FIG. 13 is provided with a front wheel-side suspension 21, a rear wheel-side suspension 22, a vehicle speed detecting section 40, and a control apparatus 100.

As described above, the control apparatus 100 acquires a front wheel-side stroke signal sf from a stroke sensor 31 of the suspension 21. In addition, the control apparatus 100 acquires a rear wheel-side stroke signal sr from a stroke sensor 32 of the suspension 22. Further, the control apparatus 100 acquires an output signal v from the speed detecting section 40.

In the control apparatus 100, a derivation section 110 calculates a front wheel-side stroke velocity Vpf from the stroke signal sf. In addition, the derivation section 110 calculates a rear wheel-side stroke velocity Vpr from the stroke signal sr. Further, a setting section 120 calculates a front wheel-side target current Itf from the stroke velocity Vpf and a vehicle speed Vc obtained from the output signal v. In addition, the setting section 120 calculates a rear wheel-side target current Itr from the stroke velocity Vpr and the vehicle speed Vc. A drive section 130 controls drive of a damping force control valve 240 of a front wheel-side damping device 21d based on the target current Itf. In addition, the drive section 130 controls drive of a damping force control valve 240 of a rear wheel-side damping device 22d based on the target current Itr.

In addition, processing performed by the control apparatus 100 may be also grasped as an invention about a control method for the suspension apparatus.

Figure 14:
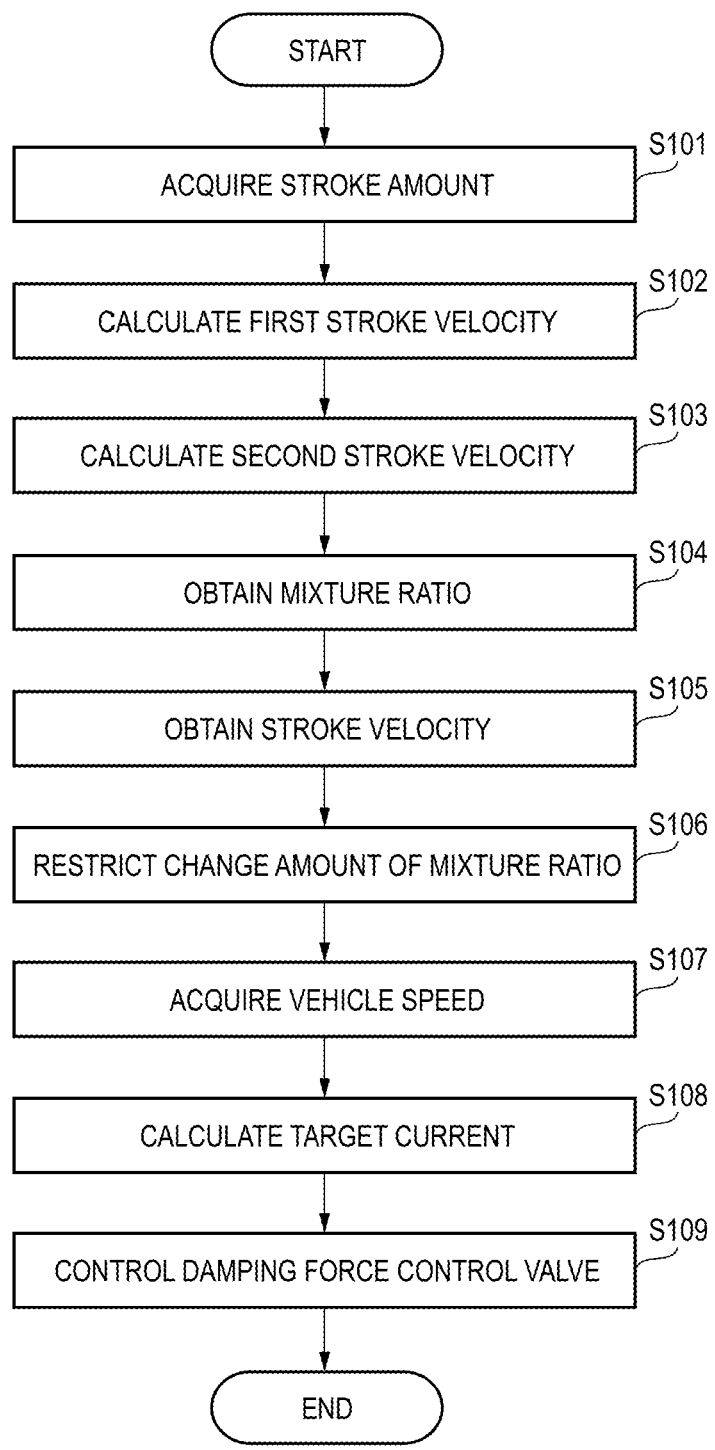
FIG. 14 is a flow chart for explaining processing performed by the control apparatus.

FIG. 14 is a flow chart for explaining the processing performed by the control apparatus 100.

First, an acquisition section 111 of the derivation section 110 acquires a stroke amount of the suspension apparatus (suspension) (step 101).

Next, a first calculation section 112a differentiates the stroke amount by use of a first time constant as a time constant, to thereby calculate a first stroke velocity Vpm1 (step 102).

In addition, a second calculation section 112b differentiates the stroke amount by use of a second time constant larger than the first time constant as a time constant, to thereby calculate a second stroke velocity Vpm2 (step 103).

Next, a mixture ratio deriving section 112c obtains a mixture ratio Kt determined based on the first stroke velocity Vpm1 (step 104).

A mixture section 112d calculates a weighted average of the first stroke velocity Vpm1 and the second stroke velocity Vpm2 by use of the mixture ratio Kt obtained by the mixture ratio deriving section 112c, to thereby calculate a final stroke velocity Vp (step 105).

Further, a mixture ratio restricting section 112e restricts a change amount of a newly obtained mixture ratio Kt when the newly obtained mixture ratio Kt has a difference not smaller than a predetermined value with respect to a previously obtained mixture ratio Kt (step 106).

On the other hand, the setting section 120 acquires a velocity speed Vc which is a speed of the vehicle based on the output signal v from the vehicle speed detecting section 40 (step 107).

Further, the setting section 120 calculates a target current It from the stroke velocity Vp and the vehicle speed Vc (step 108).

The drive section 130 controls drive of the damping force control valve 240 of the damping device 21d, 22d based on the target current It (step 109).

It can be considered that the control method for the suspension apparatus according to the present embodiment includes the following three steps.

(1) A movement amount acquiring step of acquiring a stroke amount of the suspension apparatus (suspension) disposed between the vehicle body and a wheel to thereby damp vibration propagated from the wheel The movement amount acquiring step corresponds to the step 101 in which the acquisition section 111 of the derivation section 110 acquires the stroke amount of the suspension in the example of FIG. 14.

(2) A calculation step of calculating a stroke velocity based the stroke amount

The acquisition step corresponds to the steps 102 to 106 in which the calculation section 112 of the derivation section 110 calculates the stroke velocity in the example of FIG. 14.

(3) A damping force control step of controlling damping force of the suspension apparatus based the stroke velocity The damping force control step corresponds to the steps 107 to 108 in which the setting section 120 calculates the target current It in the example of FIG. 14.

Further, it is possible to consider that the calculation step includes the following five steps.

(2-1) A first calculation step of differentiating the stroke amount by use of a first time constant as a time constant, to thereby calculate a first stroke velocity The first calculation step corresponds to the step 102 in which the first calculation section 112a calculates the first stroke velocity Vpm1 in the example of FIG. 14.

(2-2) A second calculation step of differentiating the stroke amount by use of a second time constant larger than the first time constant as a time constant, to thereby calculate a second stroke velocity The second calculation step corresponds to the step 103 in which the second calculation section 112b calculates the second stroke velocity Vpm2 in the example of FIG. 14.

(2-3) A mixture ratio deriving step of obtaining a mixture ratio Kt determined based on the first stroke velocity Vpm1

The mixture ratio deriving step corresponds to the step 104 in which the mixture ratio deriving section 112c obtains the mixture ratio Kt determined based on the first stroke velocity Vpm1 in the example of FIG. 14.

(2-4) A stroke velocity calculating step of calculating a weighted average of the first stroke velocity and the second stroke velocity using the mixture ratio, to thereby obtain a stroke velocity The stroke velocity calculating step corresponds to the step 105 in which the mixture section 112d calculates the weighted average of the first stroke velocity Vpm1 and the second stroke velocity Vpm2 by use of the mixture ratio Kt obtained by the mixture ratio deriving section 112c to thereby calculate the final stroke velocity Vp in the example of FIG. 14.

(2-5) A restriction step of restricting a change amount of a newly obtained mixture ratio Kt when the newly obtained mixture ratio Kt has a difference not smaller than a predetermined value with respect to a previously obtained mixture ratio Kt The restriction step corresponds to the step 106 in which the mixture ratio restricting section 112e restricts the change amount of the newly obtained mixture ratio Kt when the newly obtained mixture ratio Kt has the difference not smaller than the predetermined value with respect to the previously obtained mixture ratio Kt in the example of FIG. 14. On this occasion, it is preferable that the mixture ratio restricting section 112e makes a degree of the restriction when the differential amount decreases with time different from a degree of the restriction when the differential amount increases with time.

Incidentally, of the aforementioned steps (2-1) to (2-5), the steps (2-3) to (2-5) are not essential. For example, in the aforementioned example, the mixture ratio Kt is obtained in the mixture ratio deriving step (2-3) and the stroke velocity is obtained based on the mixture ratio Kt in the stroke velocity calculating step (2-4). However, the present invention is not limited thereto. That is, the stroke velocity may be obtained based on the first stroke velocity and the second stroke velocity by some method after the first stroke velocity and the second stroke velocity are obtained by the steps (2-1) to (2-2). For example, a method may be used to substitute the first stroke velocity and the second stroke velocity in a map indicating correspondence between the first stroke velocity and the stroke velocity and the stroke velocity to thereby obtain the stroke velocity.

REFERENCE SIGNS LIST

1 ... motorcycle, 2 ... front wheel, 3 ... rear wheel, 10 ... vehicle body, 21d ... front wheel-side damping device, 22d ... rear wheel-side damping device, 100 ... control apparatus, 110 ... derivation section, 111 ... acquisition section, 112 ... calculation section, 112a ... first stroke velocity calculating section, 112b ... second stroke velocity calculating section, 112c ... mixture ratio deriving section, 112d ... mixture section, 112e ... mixture ratio restricting section, 120 ... setting section, 130 ... drive section, 300 ... differential quantity calculation apparatus, 310 ... differentiation-subject amount acquiring section, 320 ... differential amount calculating section, 400 ... recording medium, 410 ... differentiation-subject amount acquiring function, 420 ... differential amount calculating function

The invention claimed is:

1. A control apparatus for a suspension apparatus, comprising:
an acquisition section which acquires a stroke amount of the suspension apparatus disposed between a vehicle body and a wheel to damp vibration propagated from the wheel;
a calculation section which calculates a stroke velocity based on the stroke amount; and
a damping force control section which controls damping force of the suspension apparatus based on the stroke velocity, wherein
the calculation section includes a first calculation section which differentiates the stroke amount by use of a first time constant as a time constant, to thereby calculate a first stroke velocity, a second calculation section which differentiates the stroke amount by use of a second time constant larger than the first time constant as a time constant, to thereby calculate a second stroke velocity, a mixture ratio deriving section which calculates a mixture ratio determined based on the first stroke velocity, and a mixture section which calculates a weighted average of the first stroke velocity and the second stroke velocity by use of the mixture ratio, to thereby calculate the stroke velocity, and the mixture ratio deriving section calculates the mixture ratio so as to increase a mixture ratio of the first stroke velocity and reduce a mixture ratio of the second stroke velocity in accordance with an increase of the first stroke velocity in a predetermined range of the first stroke velocity.

2. The control apparatus for the suspension apparatus according to claim 1, wherein the calculation section further includes a mixture ratio restricting section, and when the mixture ratio that has been newly obtained has a difference not smaller than a predetermined value with respect to the mixture ratio that was previously obtained, the mixture ratio restricting section restricts a change amount of the mixture ratio which has been newly obtained.

3. The control apparatus for the suspension apparatus according to claim 2, wherein the mixture ratio restricting section places a restriction on the change amount of the mixture ratio when the stroke velocity decreases with time and a restriction on the change amount of the mixture ratio when the stroke velocity increases with time, and a degree of the restriction placed when the stroke velocity decreases with time is different from a degree of the restriction placed when the stroke velocity increases with time.

4. A suspension system comprising:

a suspension apparatus which is disposed between a vehicle body and a wheel of a vehicle to damp vibration propagated from the wheel; and a control section which controls damping force of the suspension apparatus, wherein the control section includes:

an acquisition section which acquires a stroke amount of the suspension apparatus;

a calculation section which calculates a stroke velocity based on the stroke amount; and a damping force control section which controls the damping force of the suspension apparatus based on the stroke velocity, the calculation section includes a first calculation section which differentiates the stroke amount by use of a first time constant as a time constant, to thereby calculate a first stroke velocity, a second calculation section which differentiates the stroke amount by use of a second time constant larger than the first time constant as a time constant, to thereby calculate a second stroke velocity, a mixture ratio deriving section which calculates a mixture ratio determined based on the first stroke velocity, and a mixture section which calculates a weighted average of the first stroke velocity and the second stroke velocity by use of the mixture ratio, to thereby calculate the stroke velocity, and the mixture ratio deriving section calculates the mixture ratio so as to increase a mixture ratio of the first stroke velocity and reduce a mixture ratio of the second stroke velocity in accordance with an increase of the first stroke velocity in a predetermined range of the first stroke velocity.

* * * * *